United States Patent [19]

Habashy et al.

[11] Patent Number: 5,530,359
[45] Date of Patent: Jun. 25, 1996

[54] BOREHOLE LOGGING TOOLS AND METHODS USING REFLECTED ELECTROMAGNETIC SIGNALS

[75] Inventors: Tarek M. Habashy, Danbury, Conn.; Jiqing Xia, Jersey City, N.J.

[73] Assignee: Schlumberger Technology Corporation, Ridgefield, Conn.

[21] Appl. No.: 382,812

[22] Filed: Feb. 3, 1995

[51] Int. Cl.$^6$ ........................................... G01V 3/08
[52] U.S. Cl. ........................................... 324/338; 324/333
[58] Field of Search .................................. 324/329, 333, 324/334, 338, 346, 351, 355, 356, 366, 358; 342/22, 459; 367/58; 181/112; 343/895, 753, 797, 911 R

[56] References Cited

U.S. PATENT DOCUMENTS

| | | | |
|---|---|---|---|
| 2,689,329 | 9/1954 | Zimmerman | 324/333 |
| 3,012,189 | 12/1961 | Doll | 324/329 |
| 4,670,717 | 6/1987 | Sender | 324/338 |
| 4,728,897 | 3/1988 | Gunton | 324/329 |
| 4,746,867 | 5/1988 | Gunton | 324/329 |
| 4,814,768 | 3/1989 | Chang | 324/333 |

*Primary Examiner*—Sandra L. O'Shea
*Assistant Examiner*—Jay M. Patidar
*Attorney, Agent, or Firm*—Martin D. Hyden; Leonard W. Pojunas

[57] ABSTRACT

A borehole logging tool such as a wireline logging tool or a logging-while drilling tool includes a tool body; a transmitting antenna located in the body; a pulser for causing the transmitting antenna to transmit an electromagnetic signal; a receiving antenna, located in the body, which includes an array of receiver elements disposed around the longitudinal axis of the tool body; and electronics for measuring the difference in signals detected by pairs of elements in the array. The receiver elements can be linear dipole elements and the electronics for analyzing the signals measures the difference in signals measured by pairs of elements so as to determine the direction of a reflecting structure from the tool.

20 Claims, 6 Drawing Sheets

BOREHOLE LOGGING TOOLS AND METHODS USING REFLECTED ELECTROMAGNETIC SIGNALS

FIELD OF THE INVENTION

The present invention relates to a tool for logging underground formations using radar in which the azimuthal direction of a reflecting structure from the borehole can be measured.

BACKGROUND OF THE INVENTION

In oil exploration and geophysical survey, it is useful to provide measuring systems which can detect locations of boundaries between different formations. Examples of applications of such systems include reservoir characterization, geo-steering in horizontal drilling, salt dome mapping for engineering of gas storage caverns and delineation of hydrocarbon traps, waste disposal control, and rock fracture detection in environmental logging. There are several advantages of using transient electromagnetic (radar) signals in such measurements. First, the arrival time of reflected signals is a direct measure of the distance of boundary locations from the borehole, if the wave speed of the background medium is known. Second, the pulse can have a narrow temporal width which gives high spatial resolution.

As well as the distance of a structure from the borehole, it is also desirable to know the azimuthal direction of the structure relative to the borehole. A borehole radar logging tool is proposed in U.S. Pat. No. 4,814,768 in which this direction is measured. This tool has a directional transmitting antenna and a corresponding directional receiving antenna. Schematic views of the directional antennas are shown in FIGS. 1(a) and 1(b). The antenna comprises an elongated conductive radiator element 10 mounted inside the angle of a pair of reflective plates 12, 14 which form a corner reflector. The tool is designed to operate in the 30MHz to 300MHz frequency range with a pulse repetition rate of more than 10 kHz. The electromagnetically active portion 16 of the antenna is filled with a dielectric material to shorten the wavelength so that the antenna will be directional at the desired frequencies. This material is typically a mixture of barium titanate and air. The transmitter and receiver are aligned in the tool such that reflected signals from a given direction only are received. The tool also includes some means to rotate the antennas so as to point in a desired direction and a direction indicator such as a flux gate compass.

It is an object of the present invention to provide a borehole radar tool which does not require rotation of the antennas to give azimuthal sensitivity for all directions.

It is a further object of the invention to provide a directional antenna which does not rely solely on a corner reflect for its directionality.

The present invention achieves this object by providing a plurality of antenna elements at different positions on the tool and measuring the difference in signals measured between the elements to obtain the directional information.

SUMMARY OF INVENTION

In its broadest aspect, the present invention provides a borehole radar tool including an antenna which comprises a plurality of receiver elements arranged around the tool axis and means for measuring the difference in signals detected by the elements to obtain directional information. The antenna can be the receiving antenna, the transmitting antenna or both. In a particularly preferred embodiment, the transmitter requires no directional focussing and so can be allowed to transmit in all directions, the azimuthal focussing being provided entirely by the receiver antenna.

Preferably, the receiver elements are arranged symmetrically around the tool axis in a circular array, each receiver element typically being located in a corner isolator. The receiver elements can comprise linear dipole elements arranged in a parallel axial arrangement around the tool axis. The corner isolators can be filled with a high dielectric material.

The signals received by the array of elements are analyzed by measuring the difference between the signals measured at pairs of elements for a given reflection, this difference providing the directional information. For example, the signal measured at one element will be compared to the signal measured at each other element in the array for the same reflection. This can be done for each element in the array so as to provide a degree of redundancy in the measurements.

The tool also typically includes a direction indicator such as a flux gate compass or the like to determine the orientation of the tool.

DETAILED DESCRIPTION OF PREFERRED EMBODIMENT

The borehole logging tool of the type to which the present invention is particularly applicable is described in U.S. Pat. No. 4,670,717 (incorporated herein by reference). The present invention resides in the realisation that a series of spaced receiver antenna elements, typically a circular array, can be used to obtain azimuthal information so as to determine the direction of reflecting structures.

Figure 1A:
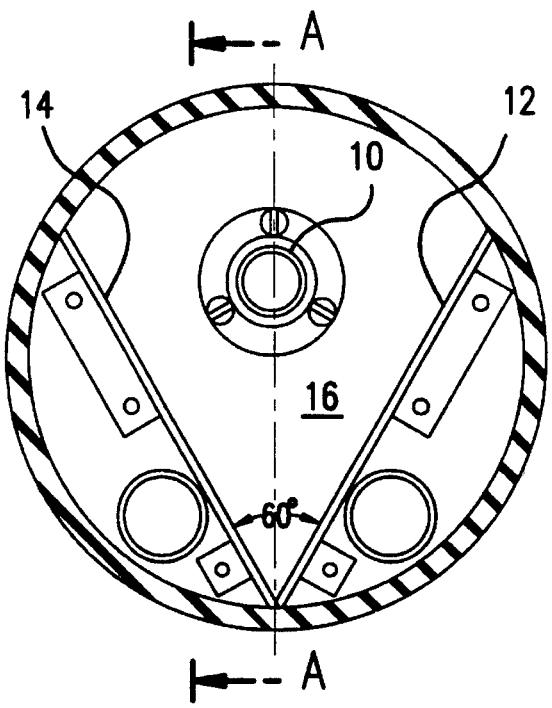
FIGS. 1(a) and 1(b) show a prior art radar logging tool antenna.
Figure 1B:
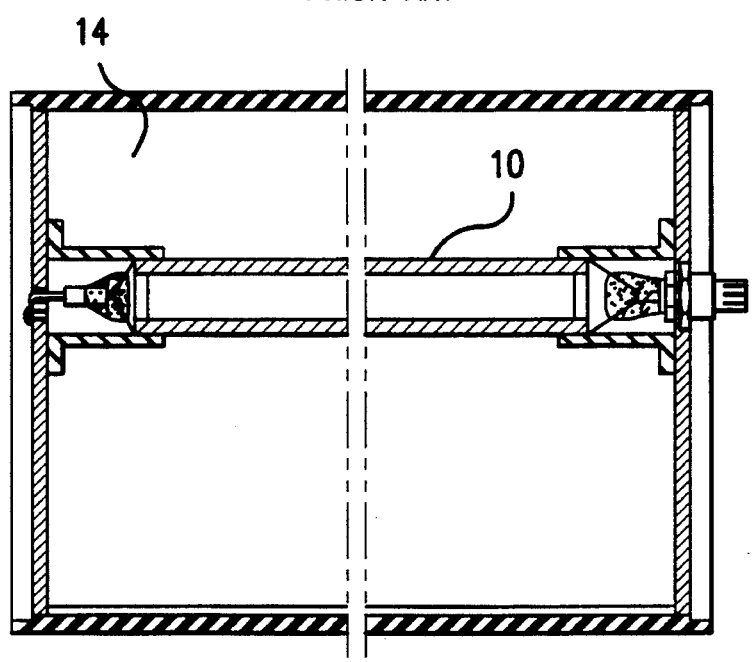
Figure 2:
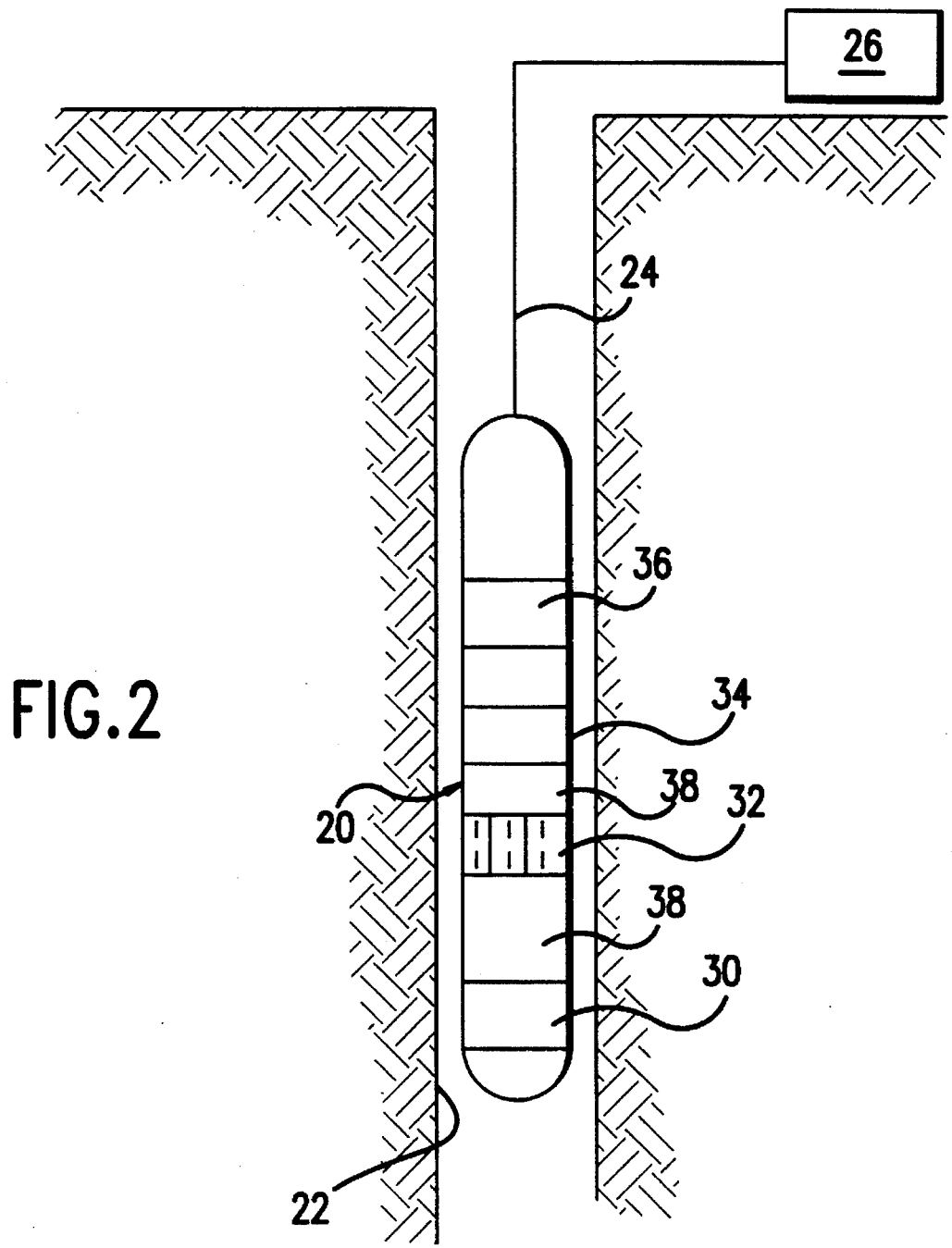
FIG. 2 shows an embodiment of a borehole radar tool according to the invention.

Referring now to FIG. 2, there is shown therein a borehole logging tool generally indicated by reference numeral 20 suspended in a borehole 22 by means of a cable 24 which is lead back to the surface and connects to a data acquisition and processing system 26 in a manner conventional in borehole formation logging. The tool 20 comprises a transmitter section 30, a receiver section 32, a receiver and digital electronics package 34 and a power supply and compass section 36. The transmitter section 30, the receiver section 32 and the receiver and digital electronics package are separated by fibreglass spacer sections 38. The transmitter section 30 includes a self-triggering, battery powered pulser arranged such that there is no metallic material between the transmitter and receiving antennas in the receiver section 32.

Figure 3:
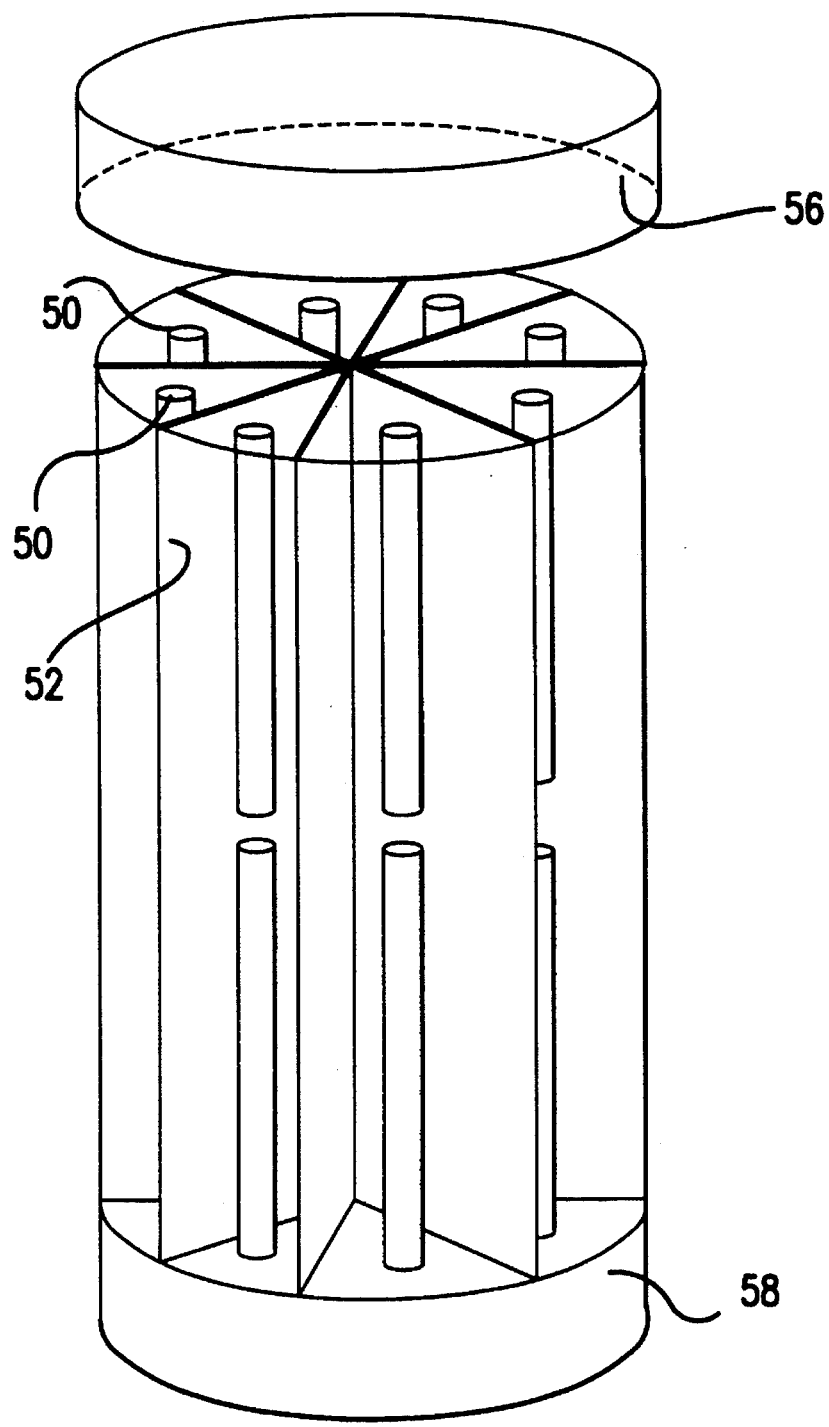
FIG. 3 shows a schematic view of the receiving antenna of the tool of FIG. 2.
Figure 6:
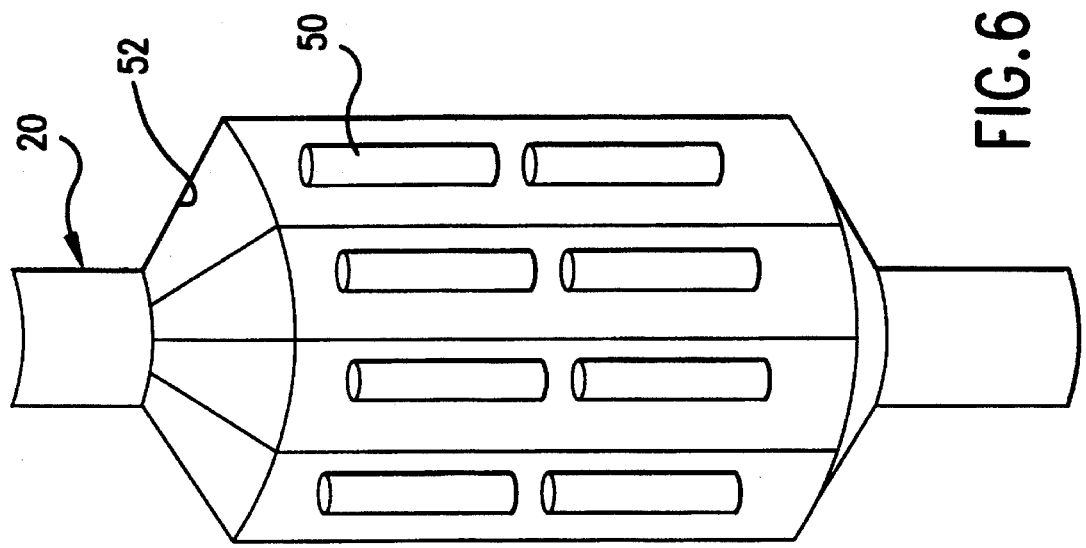
FIG. 6 shows an alternative receiver antenna according to the present invention.
Figure 4:
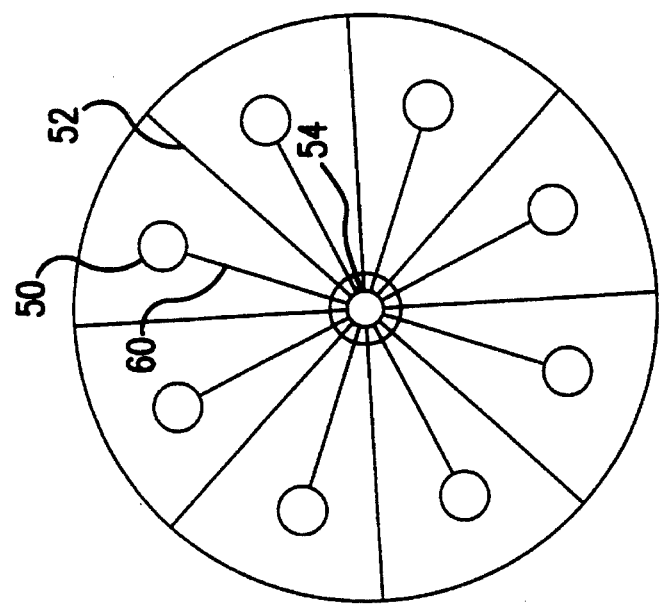
FIG. 4 shows a cross section of the antenna of FIG. 3.

FIGS. 3 and 6 show different embodiments of a receiver antenna for use in the receiver section 32 of the tool of FIG. 2. The antenna shown in FIGS. 3 and 4 comprises a circular array of linear antenna elements 50 which are aligned with the tool axis and positioned in a respective corner isolator 52. Each element 50 is connected by means of a feed wire 60 to a central feed 54 which connects the antenna to the digital electronics package 34. The linear elements 50 comprise pairs of dipoles and the corner isolators 52 are formed from copper plates. The space around the elements 50 is filled with a high dielectric material which typically has a dielectric constant in the range 20–150. It is desirable that the high dielectric material has a dielectric constant which matches that of the borehole fluid as closely as possible. Absorbing plates 56, 58, which can be formed from PTFE resin for example, are provided at either ends of the antenna to act as an impedance match for the linear elements. This top loading has the effect of reducing antenna resonances due to multiple reflections of pulses between the ends of the antenna elements.

The manner of operation of the tool is substantially as described in U.S. patent application Ser. No. 08/353,462 (incorporated herein by reference). In use, the transmitter emits an electromagnetic pulse which typically has a center frequency around 40 MHz and a highest frequency component at about 120 MHz. This pulse radiates in all directions into the formation and is reflected by structures therein back to the tool in the borehole. The transit time for the pulse to travel from the tool to the structure and back to the tool is used to determine the distance of the reflecting structure from the borehole. Directional information is obtained by taking differences in detected signal between pairs of receiving antenna dipole elements. The differencing can be performed in software, in which case the value of the signal from each element is measured and then the difference between these values is calculated. This differencing is perforated by direct measurement across each pair so as to maximize signal to noise ratio. In this case, each element is hard wired to a dedicated sensor in phase opposition to another element in the array so as to provide a direct measurement of the signal difference between the elements. Thus for an array of eight elements there will be 28 sensors each measuring the difference between a different pair of elements in the array. In use, the measurements will be simultaneous and each difference measurement can be analyzed to give directional information.

Figure 5:
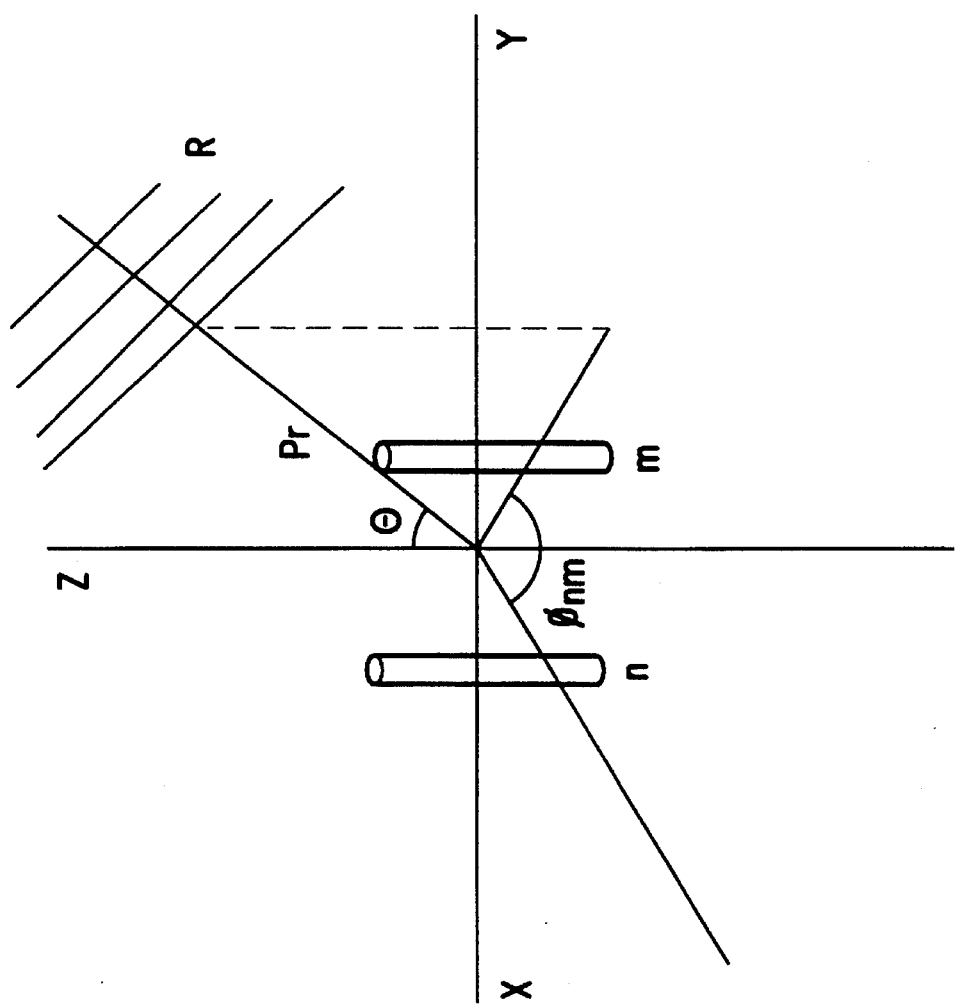
FIG. 5 show a schematic representation of a signal measured by two antenna elements.

In the frequency domain and for a plane wave incident on such an array, the difference signal for the m-th and n-th elements of the array $S_{nm(\theta,\phi)}$ will be proportional to:

$$S_{nm}(\theta,\phi) \propto |1 - e^{-ikd_{nm}\sin\theta\cos\phi_{nm}}| \approx kd_{nm}\sin\theta\cos\phi_{nm} \text{ since } kd \ll 1, \quad (1)$$

where $k=2\pi/\lambda$, $d_{nm}$ is the separation between the two elements, $\theta$ is the angle of the direction of propogation with the borehole axis and $\phi_{nm}$ is the angle of the direction of propogation in the azimuthal plane relative to the perpendicular to the axis connecting the nth and m-th elements of the array. Thus it can be seen that each difference measurement contains directional information about the signal and so by making several different measurements, several estimates of the direction of the return signal can be obtained and so the direction estimated with greater accuracy by using all of these estimates. This relationship can be visualized by reference to FIG. 5 which shows two antenna elements n and m and three orthogonal axes, z which is parallel to the long axis of the elements and hence the tool and borehole, y which is perpendicular to the z axis and connects the two elements, and x which is perpendicular to both the z and y axes. The reflected signal shown as R approaches the elements n and m along a propogation direction Pr. The angle of Pr to the z axis is the angle $\theta$ in equation (1) above, and the projection of this onto the x-y plane (azimuthal plane) forms the angle $\phi_{nm}$ with the x axis. The two antenna elements are shown in isolation since this relationship holds true for any two elements in the array. Thus each pairing of two elements provides an estimate of the direction of the reflecting structure from the tool.

Qualitatively, when a signal arrives from a specific direction, the element positioned in the coner isolator facing that direction measures the signal. The other elements in the receiver antenna measure a weaker signal at later times. The corner isolators are not sufficient to eliminate signals from all directions but do reduce the signals from directions other than those towards which the open part of the isolator faces and so have the effect of reducing cross-talk between elements and so improves directional sensitivity. Filling of the space around the elements between the corner isolators with high dielectric material has the effect of reducing signal wavelength inside the material and so increasing the electrical distance between adjacent elements of the array. This also reduces cross-talk and enhances directional discrimination.

A similar alternative system is shown in FIG. 6 in which corresponding numbers are used for the pans shown in FIG. 3. It is clear from equation (1) above that the difference signal is proportional to the spacing between elements. To further improve signal to noise ratio, the physical design of the antenna can be modified. In the case of the FIG. 6, the elements are mounted on an enlarged sonde which has an increased distance between elements and also has the effect of placing the elements close to the borehole surface thus reducing borehole effects such as attenuation by low resistivity borehole fluid.

In either of the preceding embodiments, increasing the frequency of the pulse to be such that the diameter of the array is comparable with the operating wavelength allows the elements to be operated as a phased array and the coverage of the antenna to be rotated electronically to provide full azimuthal coverage. For typical borehole diameters the operating frequency needs to be in the order of 300MHz.

Figure 7:
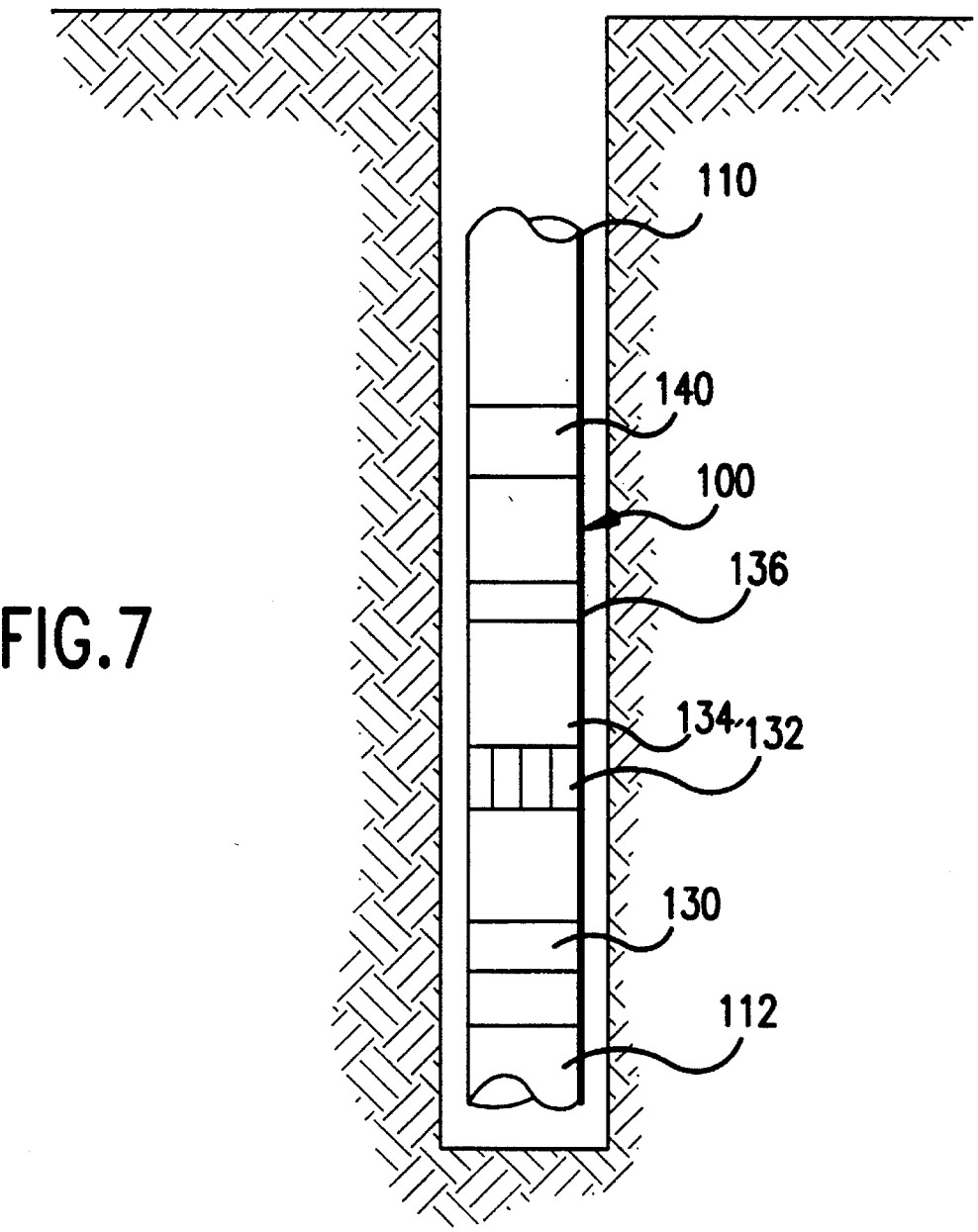
FIG. 7 shows a logging-while-drilling tool according to the invention.

FIG. 7 shows a logging-while-drilling tool which incorporates the present invention. Corresponding reference numerals to FIG. 2 but in the 100 series are used for corresponding pans in this embodiment. In this case, the tool is incorporated into a bottom hole assembly 100 attached to the end of a drill swing 110 with a drill bit 112 attached at the extreme end thereof. The LWD tool comprises a transmitter section 130, a receiver section 132 including antenna elements as described above, receiver and digital electronics package 134 and a power supply and compass section 136. The output of the receiver electronics package 136 is passed to a telemetry package 140 for communication to the surface in the conventional manner for LWD tools. Measurements can be made either when the drill string is stationary or rotating. In the latter case an additional measurement is made to allow the radar measurements to be related to the rotational position of the drill string in the borehole. This is preferably done by making simultaneous measurements of the direction of the earth's magnetic field with the compass which can be related to a reference measurement made when the drill string is stationary.

We claim:
1. A borehole logging tool, comprising:
a) a tool body;
b) a transmitting antenna located in the body;
c) means for causing the transmitting antenna to transmit an electromagnetic signal;
d) a receiving antenna, located in the body in an axially spaced relationship from the transmitting antenna, which comprises an array of receiver elements disposed around a longitudinal axis of the tool body; and
e) means for measuring a difference in signals detected by pairs of elements in the array.

2. A tool according to claim 1, wherein the receiving antenna comprises a substantially symmetrical array of elements around the longitudinal axis of the tool body.

3. A tool according to claim 1, wherein the receiver elements comprise linear dipole elements aligned with the longitudinal axis of the tool body.

4. A tool according to claim 1, wherein the means for measuring the difference in signals between pairs of elements comprises a difference measuring device connected between each pair of elements in the array.

5. A tool according to claim 1, wherein the means for measuring the difference in signals between pairs of elements comprises means for measuring a signal level at each element and then determining the difference between signal levels measured by pairs of elements in the array.

6. A tool according to claim 1, further comprising means for determining a direction of propagation of a signal detected by the receiving antenna.

7. A tool according to claim 6, wherein the means for determining direction analyzes the difference in signals detected by pairs of elements in the array and determines the direction of propogation according to the relationship $$S_{nm}(\theta,\phi) = kd_{nm} \sin\theta \cos\phi_{nm}$$

where $k=2\pi/\lambda$, $d_{nm}$ is the separation between the two elements n and m, $\theta$ is the angle of the direction of propogation with the borehole axis and $\phi_{nm}$ is the angle of the direction of propogation in the azimuthal plane relative to the perpendicular to an axis connecting the n-th and m-th elements of the array.

8. A tool according to claim 1, wherein each receiver element is located within a corner reflector.

9. A tool according to claim 8, wherein the corner reflectors together provide 360° coverage around the tool axis.

10. A logging-while drilling tool, comprising:
a) a drill string;
b) drill collars connected to the drill string;
c) a drill bit connected to the drill string;
d) a transmitter located in the drill collars near to the drill bit;
e) a receiving antenna, located in the drill collars in an axially spaced relationship from the transmitter, which comprises an array of receiver elements disposed around a longitudinal axis of the drill collars; and
f) means for measuring a difference in signals detected by pairs of elements in the array.

11. A logging-while drilling tool according to claim 10, wherein the receiving antenna comprises a substantially symmetrical array of elements around the longitudinal axis of the drill collars.

12. A logging-while drilling tool according to claim 10, wherein the receiver elements comprise linear dipole elements aligned with the longitudinal axis of the drill collars.

13. A logging-while drilling tool according to claim 10, wherein the means for measuring the difference in signals between pairs of elements comprises a difference measuring device connected between each pair of elements in the array.

14. A logging-while drilling tool according to claim 10, wherein the means for measuring the difference in signals between pairs of elements comprises means for measuring a signal level at each element and then determining a difference between signal levels measured by pairs of elements in the array.

15. A logging-while drilling tool according to claim 10, further comprising means for determining a direction of propagation of a signal detected by the receiving antenna.

16. A logging-while drilling tool according to claim 15, wherein the means for determining direction analyzes the difference in signals detected by pairs of elements in the array and determines the direction of propagation according to the relationship $$S_{nm}(\theta,\phi) = kd_{nm} \sin\theta \cos\phi_{nm}$$

where $k=2\pi/\lambda$, $d_{nm}$ is the separation between the two elements n and m, $\theta$ is the angle of the direction of propogation with the borehole axis and $\phi_{nm}$ is the angle of the direction of propogation in the azimuthal plane relative to the perpendicular to an axis connecting the n-th and m-th elements of the array.

17. A logging-while drilling tool according to claim 10, wherein each receiver element is located within a corner reflector.

18. A logging-while drilling tool according to claim 17, wherein the corner reflectors together provide 360° coverage around the tool axis.

19. A logging-while-drilling tool according to claim 10, further comprising compass means for detecting, when the tool is positioned in a borehole, the position of the drill collars in the borehole relative to the earth's magnetic field.

20. A method of detecting structures in underground formations through which a borehole is being drilled with a drill string having drill collars and a drill bit connected thereto, the method comprising:
a) transmitting from a first location in the drill collars an electromagnetic signal into the formation;
b) receiving at a second location in the drill collars a reflected signal from the structures using an array of receiver elements disposed around a longitudinal axis of the drill collars;
c) measuring a rotational position of the drill collars in the borehole;
d) analyzing the reflected signals received at the second location with respect to the rotational position of the drill collars in the borehole to determine relative positions of the structures with respect to the borehole.

* * * * *